United States Patent [19]

Abramowski et al.

[11] Patent Number: 5,124,395
[45] Date of Patent: Jun. 23, 1992

[54] NON-OZONE DEPLETING, NON-FLAMMABLE TIRE SEALER AND INFLATER COMPOSITION

[75] Inventors: Herst Abramowski, Matthews; James D. Wells, Charlotte, both of N.C.

[73] Assignee: Radiator Specialty Company, Charlotte, N.C.

[21] Appl. No.: 691,419

[22] Filed: Apr. 25, 1991

[51] Int. Cl.⁵ .......................... C08J 3/03; C08K 5/02; C08L 27/12
[52] U.S. Cl. .................... 524/462; 524/377; 524/428; 524/563
[58] Field of Search ............... 524/377, 428, 563, 462

[56] References Cited

U.S. PATENT DOCUMENTS

| | | | |
|---|---|---|---|
| 2,991,629 | 7/1961 | Rose | 62/48 |
| 3,705,669 | 12/1972 | Cox et al. | 222/394 |
| 3,843,586 | 10/1974 | Wolf | 260/29.7 R |
| 3,860,539 | 1/1975 | Miyazato | 523/166 |
| 4,054,163 | 10/1977 | Brown, Jr. et al. | 141/291 |
| 4,101,494 | 7/1978 | Kent et al. | 260/29.6 B |
| 4,137,206 | 1/1979 | Kent | 260/29.6 B |
| 4,224,208 | 9/1980 | Kent | 260/29.6 B |
| 4,337,322 | 6/1982 | Jaspon | 523/166 |
| 4,426,468 | 1/1984 | Ornum et al. | 523/166 |
| 4,501,825 | 2/1985 | Magyar et al. | 521/78 |
| 4,513,803 | 4/1985 | Reese | 152/427 |
| 4,582,108 | 4/1986 | Markow et al. | 152/418 |
| 4,851,595 | 7/1989 | Gumprecht | 570/170 |
| 4,898,645 | 2/1990 | Voigt et al. | 203/67 |
| 4,970,242 | 11/1990 | Lehman | 524/272 |

OTHER PUBLICATIONS

"The Ozone Lay, The Greenhouse Effect", *ICI Americas Inc.*, General Chemical's Dept., Halocarbon Devel. Gropu, Wilmington, Del. 19897.

"Potential Substitues To Chlorofluorcarbons As Aerosol Propellants," *ICI Chemicals and Polymers Limited*, Brochure No. GZ/20069/20707/2ED/23/989 Cheshire, England.

"'ARCTON' 134a Preliminary Data Sheet," *ICI Chemicals and Polymers Limited*, Brochure No. GC/16882/20080/4Ed/13/789, Jul. 1989.

*Primary Examiner*—Paul R. Michl
*Assistant Examiner*—U. K. Rajguru
*Attorney, Agent, or Firm*—Mason, Fenwick & Lawrence

[57] ABSTRACT

A new tire sealant and inflator composition is provided, which combines a sealant in an aqueous carrier with a non-flammable, non-ozone depleting propellant/inflator. A preferred composition combines a sealant composition with 1,1,1,2-tetrafluoroethane (134a). In a preferred embodiment, a vapor pressure depressant is combined with the sealant and 134a. A preferred sealant and inflator composition comprises from about 20% to about 80% of 134a, from about 2% to about 10% of a sealer, such as latex, or a polyvinyl acetate emulsion; from about 1% to about 8% of a freezing point depressant, such as an alkylene glycol; from about 0.1% to about 1% of a corrosion inhibitor, such as ammonia; from about 30% to about 70% of a carrier, such as water; and from about 4% to about 40% of a vapor pressure depressant, such as a glycol ether. A preferred vapor pressure depressant is 2-butoxyethanol, and a preferred freezing point depressant is ethylene glycol. Preferably the sealant composition combine with 134a or other non-flammable and non-ozone depleting propellant/inflator is biodegradable.

19 Claims, 4 Drawing Sheets

NON-OZONE DEPLETING, NON-FLAMMABLE TIRE SEALER AND INFLATER COMPOSITION

FIELD OF THE INVENTION

This invention relates to a new composition and method for inflating and sealing inflatable objects, and relates more particularly to a sealant and inflator composition for tires, which is non-flammable and does not harm the ozone layer, and a method for using the composition.

BACKGROUND OF THE INVENTION

Tire sealing compositions that both inflate and seal tires are well known. For example, Magyar et al. U.S. Pat. No. 4,501,825, discloses a tire sealant and inflator composition that includes a resin, a latex sealant, an alkylene glycol, fibers, an alkanol amine, a foaming agent, and water. The composition is admixed with a chlorofluorocarbon propellant/inflator. Other patents which disclose tire sealing compositions include those to Jaspon, U.S. Pat. No. 4,337,332, to Ornum et al. U.S. Pat. No. 4,426,468, and to Kent U.S. Pat. Nos. 4,224,208, 4,137,206, and 4,101,494. All patents and other references mentioned above or hereafter are incorporated by reference as if reproduced in full below. [A propellant/inflator is defined herein as any substance which can propel a solution from a container into an inflatable object, and which will also act to inflate the object.]

Prior art tire sealing and/or inflating compositions use hydrocarbons or chlorofluorocarbons as propellants/inflators. Most hydrocarbon propellants are flammable, and there are difficulties and potential risks associated with using hydrocarbons as inflators. Chlorofluorocarbons, CFCs, are used throughout the world in refrigerators, air conditioners, aerosols, and for blowing foam insulation. CFCs are generally viewed as being non-toxic, non-flammable, and safe for use in proximity to humans. Unfortunately, it has recently been discovered that CFCs have a harmful effect on the ozone layer located in the upper atmosphere; since the ozone layer filters harmful radiation from the Earth's surface, increased incidences of skin cancer are believed to result from reductions in the ozone layer thickness or concentration.

Efforts have been made on an international level to reduce CFC usage; these efforts resulted in The Vienna Convention and its Montreal protocol, which are designed to protect the ozone layer by limiting the amount of CFCs released into the atmosphere. Since not all CFCs regulated by the protocol pose the same threat to the ozone layer, individual compounds are assigned ozone depletion potentials, ODPs. ODPs are a measure of the possible effect of the chlorine released by a CFC on the ozone concentration in the ozone layer. ODPs are calculated from the atmospheric lifetime of the compound, and from the effectiveness of the chlorine released once the compound is decomposed by ultra-violet light. The current aim of the protocol is a phased reduction in total ODP arising from regulated CFCs in steps of 20% and 50%. (See "The Ozone Layer, The Greenhouse Effect," ICI America's Inc., General Chemicals Department, Halocarbon Development Group, Wilmington, Del. 1987.) For example, CFC-11 (otherwise known as F-11, freon-11, arcton, or trichlorofluoromethane) has an ODP of 1.0, as does freon 12 (dichlorodifluoromethane). A compound with an ODP of zero should have no substantial negative impact on the ozone layer.

Recent U.S. legislation, such as the Clean Air Act, has set a timetable for phasing out CFCs. Therefore, it is highly desirable to substitute CFCs with non-ozone depleting, nonflammable compounds wherever possible. Recently, a new nonflammable refrigerant and blowing agent, known as arcton 134a (1,1,1, 2-tetrafluoroethane or R134a) was invented, which has an ODP of zero, yet is non-corrosive and non-toxic. (See Gumprecht U.S. Pat. No. 4,851,595, and Voigt et al. U.S. Patent No. 4,898,645, for processes for the production of 1,1,1,2-tetrafluoroethane.)

It is therefore desirable to replace the chlorofluorocarbon and/or flammable hydrocarbon propellant/inflators used in conventional tire sealing and inflator compositions with a non-flammable substitute such as 134a, which has a low ozone depletion potential. However, numerous problems must be overcome in order to replace chlorofluorocarbon or hydrocarbon propellants/inflators used in existing tire sealant and inflator compositions with a nonflammable, non-ozone depleting propellant/inflator. These problems result from differences between the vapor pressures of existing propellant/inflators and suitable CFC substitutes, poor solvent properties of CFC substitutes, higher diffusion rates of CFC substitutes, and difficulties in obtaining consistent discharge rates throughout the life of tire sealer and inflator products when using a CFC or flammable hydrocarbon substitute.

It is particularly important that any non-flammable, nonozone depleting propellant/inflator used in a tire sealer and inflator composition be capable of storage in canisters which can be safely transported. The U.S. Department of Transportation, DOT, has issued regulations regarding minimum performance characteristics of containers which can be used in interstate transportation. These standards are met by existing containers used for conventional tire sealant/inflator compositions, and any tire sealer/inflator composition made with a non-flammable, non-ozone depleting propellant/inflator must also meet the DOT standards.

However, attempts to substitute R-134a for conventional CFC propellants/inflators have been unsuccessful since R-134a has a vapor pressure at 130° F. which is too great to meet the DOT requirements for use in aerosol cans, such as those which are used for storing and transporting conventional tire sealing and inflating compositions. Further, R-134a is not miscible with aqueous solvents, and therefore, tire sealant/inflator compositions made by replacement of existing hydrocarbon or CFC propellants with R-134a would require vigorous and frequent agitation before and during use to prevent disproportionate dispensing of the sealant.

Tire sealant/inflator cans are frequently stored in the trunks of vehicles, or worse, are exposed to direct sunlight in sealed vehicles in mid-summer. Therefore, internal pressure and can strength are very important safety parameters, which must be considered in producing a tire sealant/inflator composition. The high vapor pressure of R-134a increases the potential that compositions using R-134a will have an even greater vapor pressure than conventional tire sealer and inflator compositions, which could lead to bursting of the containers used to store the compositions.

Hydrofluorocarbons with ODPs of zero, such as 1,1-difluoroethane HFA 152a, ODP=Zero) and 1,1,1,2-tetrafluoroethane, also have relative diffusion rates which are higher than most CFCs; therefore, it was believed that, even if tires or other inflatable objects could be inflated with R-134a or HFA-152a, that the tires would not stay inflated due to effusion and/or diffusion of the CFC substitutes into or through the tire rubber.

Thus, there is a need for sealer and inflator compositions which do not utilize flammable propellant/inflators, or use propellant/inflators which harm the ozone layer, and there is a need for sealer and inflator compositions having vapor pressures at elevated temperatures which are sufficiently low to allow storage in containers which meet Department of Transportation requirements for aerosol cans. There is also a need for a non-flammable tire sealing and inflating composition which does not harm the ozone layer, and is homogenous to prevent disproportionate dispensing, and which allows consistent discharge rates and spray characteristics throughout the life of the product. There is a further need for a tire sealing and inflating composition with the foregoing properties which functions over a wide range of temperatures, preferably between 25° F. and 100° F.

Thus, it is a primary object of the present invention to provide a tire sealant and inflator composition which combines a sealant with a non-flammable propellant/inflator having an ozone depletion potential of zero;

It is a further object of the present invention to provide a sealer and inflator composition which contains a biodegradable sealant and a non-flammable, non-ozone depleting propellant/inflator;

It is a further object of the present invention to provide a sealer and inflator composition which utilizes a propellant/inflator having an ozone depletion potential of zero, and which does not have a vapor pressure in excess of 180 psig when the temperature is 130° F.;

It is yet another object of the present invention to provide a sealer and inflator composition containing a nonflammable propellant/inflator with an ODP of zero in an easy to transport container which meets U.S. Department of Transportation requirements; and It is still yet another object of the present invention to provide a method for inflating inflatable objects, such as tires, with a sealer and inflator composition which is nonflammable and has an ozone depletion potential of zero.

It is yet a further object of the present invention to provide a sealer and inflator composition containing a nonflammable propellant/inflator with an ODP of zero which functions at least between the temperatures of 25° F. and 100° F.

SUMMARY OF THE INVENTION

These and other objects of the present invention are accomplished through the production of a new sealer and inflator composition contained in an aerosol container, which has a propellant that is non-flammable and does not harm the ozone layer. The sealer and inflator composition is preferably formed with a sealant component, which is capable of sealing openings in inflatable objects on contact with air, and a propellant/inflator which is non-flammable and has an ozone depletion potential of zero. Preferably the sealant is made from a polyvinyl acetate emulsion combined with a carrier, such as water, and, in an alternate preferred embodiment, an alkylene glycol is added as a freeze-point depressant. In another preferred embodiment, ammonia is also added to the sealant composition as a corrosion inhibitor. Preferably, 1,1,1,2-tetrafluoroethane (134a) is combined with sealant under pressure sufficient to liquify the 134a. In a further preferred embodiment, a vapor pressure depressant is combined with the sealant and 134a to ensure that the mixture has a vapor pressure of less than 180 psig at 130° F. A preferred sealer and inflator composition comprises:

| Component | Weight Percent |
|---|---|
| Sealer | 2-10 |
| Freezing Point Depressant | 1-8 |
| Corrosion Inhibitor | 0.1-1.0 |
| Carrier | 30-70 |
| Inflator/Propellant | 20-80 |
| Vapor Pressure Depressant | 4-40 |

Preferably the sealer is a latex, or a polyvinyl acetate emulsion or any other sealant capable of sealing openings in inflatable objects on contact with air, and in particular the sealer is suitable for sealing holes in automotive or light truck tires. Preferably, the freezing point depressant is an alkylene glycol, such as ethylene glycol, and the preferred carrier is water. A preferred vapor pressure depressant is butyl cellosolve; other glycol ethers, alkyl acetates, or other compounds may also be used as vapor pressure depressants, provided they are capable of maintaining the vapor pressure below 180 psig at 130° F. of a sealer/inflator composition containing a non-flammable propellant/inflator having an ozone depletion potential of zero combined with an aqueous carrier and a suitable sealant, and at the same time be functional in the approximately 25° F. range. [A suitable sealant is defined as any sealing composition which is capable of sealing holes in an automotive or light truck tire when the sealant is injected into the tire.]

Preferably, the sealant and inflator composition is contained in an aerosol container under sufficient pressure to liquify the propellant/inflator. Such containers are well-known in the art, and preferably contain an exit port which is operated by a valve. Preferably, the exit port is provided with a flexible tube, or an adapter-actuator, that terminates with a connector which can be fitted to conventional tire valve stems. Preferably, the interior of the container is placed in fluid communication with the interior of a tire or other object to be inflated by connecting the connector on the tube, or the adapter-actuator, to a valve stem or similar inlet on a tire or inflatable object, and actuating the valve on the container. This allows the pressure inside of the container to reach equilibrium with the pressure inside the tire or inflatable object; the lower pressure in the tire allows the liquified propellant/inflator to vaporize to its gaseous state, and to thereby expand; this pressure differential propels both sealant and the propellant/inflator into the inflatable object. Provided the inflatable object or tire being inflated achieves an internal pressure which is greater than the external pressure applied thereto, the tire or other inflatable object will be inflated and, provided any holes in the tire or inflatable object are sealed, will stay inflated.

DETAILED DESCRIPTION OF THE INVENTION

Prior art tire sealant and inflator compositions generally consist of a sealant and a water carrier combined with a hydrocarbon or chlorofluorocarbon propellant/inflator. Since tire sealants and inflators are generally stored in the trunk of a vehicle, a freeze point depressant is frequently added to minimize the risk that the solution will freeze and cause the pressurized container to burst. It is also common practice to add a corrosion inhibitor, such as ammonia or an alkanolamine. The flammability of hydrocarbon propellants and the damage caused to the ozone layer by CFC propellants led to attempts to replace hydrocarbon and CFC propellants with non-flammable, non-ozone depleting substitutes in conventional tire sealer and inflator compositions. An example of a high quality conventional tire sealant and inflator composition is sold under the trademark PUNCTURE SEAL, and is available from RADIATOR SPECIALTY COMPANY of Charlotte, N.C. PUNCTURE SEAL demonstrates excellent tire inflation and sealant characteristics, and any non-flammable, non-ozone depleting sealant and inflator composition should have similiar characteristics.

A preferred propellant/inflator should have an ozone depletion potential of zero, be non-flammable, have good solvent properties, have low toxicity, provide for consistent discharge rates throughout the life of the aerosol product, have a low cost, have a relative diffusion rate equivalent to existing propellants, and have a vapor pressure at 130° F. of less than 180 psig. Unfortunately, no CFC substitute has yet been found which meets all of these criteria. However, 1,1,1,2-tetrafluoroethane (HFC 134a, R-134a or 134a) has an ODP of zero, is non-flammable, has a boiling point of minus −15.5° F., and has a vapor pressure at 68° F. of 68.4 psig. Therefore, experiments were undertaken to determine if 134a could be used to replace the hydrocarbon or CFC propellants currently used in existing tire sealant and inflator compositions.

PRELIMINARY EXPERIMENTS

Figure 1:
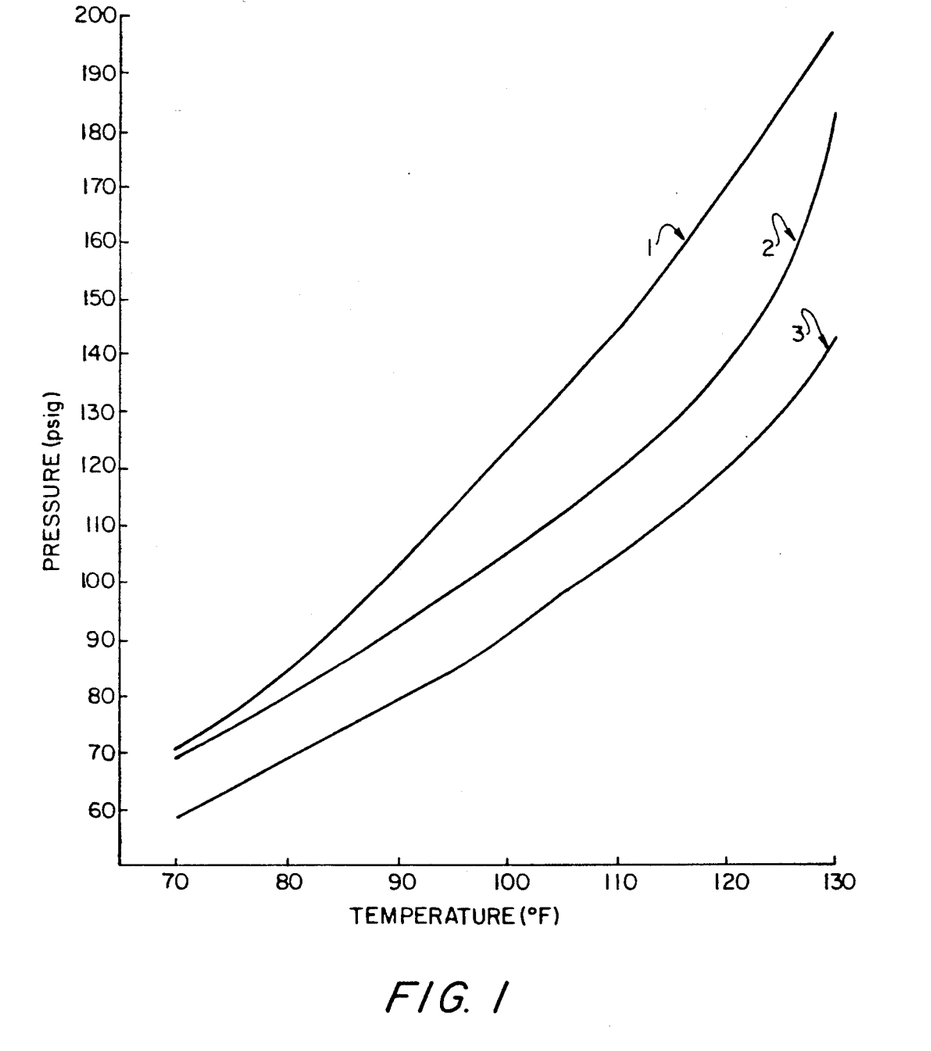
FIG. 1 is a chart showing the vapor pressure versus temperature of 134a, of 134a mixed with a sealer in an aqueous carrier, and of 134a mixed with a sealer in an aqueous carrier combined with 2-butoxyethanol.

Initially, the vapor pressure of 134a at various temperatures was determined. With reference to FIG. 1, line 1 illustrates the vapor pressure of 134a at various temperatures. Note that the vapor pressure at 130° F. is well in excess of 180 psig (approximately 198 psig).

HFC 134a was then added to a conventional sealant mixture formed of water, ammonium hydroxide, a vinyl acetate copolymer, and ethylene glycol. Approximately 200 grams 134a was combined with approximately 300 grams of the sealant composition. (Conventional tire sealer and inflator compositions are sold in cans capable of holding 12 ounces or 24 ounces net weight of sealer mixed with propellant). Obviously, larger tires require a larger amount of propellant/inflator. For example, 200 grams of 134a should generate approximately 1.55 cubic feet of gas at ambient temperatures, and 300 grams of 134a should generate approximately 2.33 cubic feet of gas at ambient temperatures.)

With reference to FIG. 1, line 2, note that the vapor pressure exceeded 180 psig at 130° F. for the mixture of 134a with the conventional sealant. Further, the 134a was not miscible with the sealant composition, and the sealant composition floated on top of the 134a layer. Frequent and vigorous shaking was necessary to obtain a uniform dispersed mixture of propellant and sealant mixture. Thus, it was not possible to merely substitute 134a for the CFC or hydrocarbon propellants used in conventional tire sealant and inflator compositions, and still be able to transport the compositions in containers which meet DOT requirements, such as the containers used for conventional tire sealer and inflator compositions.

Conventional tire sealer and inflator compositions are generally sold in cans which are capable of withstanding internal pressures of 160 psig without distorting, and which will not burst at pressures beneath 240 psig. This is consistent with Title 49 of the Code of Federal Regulations §178.33, which requires that a can must not burst at 1.5 times the internal pressure measured at 130° F. The DOT designates cans as "2-P" which can withstand distortion at pressures beneath 160 psig and which will not burst below 240 psig, and designates cans as "2-Q" which will not distort at pressures beneath 180 psig and which will not burst at pressures below 270 psig. See Title 49 of the Code of Federal Regulations for an understanding of the general requirements, and see 49 CFR §§178.33 and 178.33a for specific requirements. It is preferred to use 2-P cans due to cost and manufacturing considerations, and therefore, preferred non-flammable, non-ozone deleting tire sealant and inflator compositions should have vapor pressures of less than 160 psig at 130° F.

The present invention overcomes the high vapor pressure and poor solvent properties associated with combining 134a with conventional tire sealant formulations, through the addition of a vapor pressure depressant. It has been discovered that certain compounds can act as vapor pressure depressants to bring the vapor pressure at 130° F. beneath 180 psig, and preferably below 160 psig at 130° F., and, surprisingly, it has been discovered that the added volume of the vapor pressure depressant combined with the 134a propellant and the sealant composition is still capable of fitting into standard 12 ounce and 24 ounce 2-P and 2-Q containers.

In a preferred embodiment, the present invention provides a tire sealant and inflator composition in a container which uses 134a as a propellant/inflator. A preferred sealant composition contains from about 2% to about 10% of a latex, a polyvinyl acetate emulsion, or other sealant capable of sealing openings in inflatable objects on contact with air; from about 30% to about 70% water; and from about 4% to about 40% of a vapor pressure depressant. It is also preferred to add about 1% to about 8% of a freezing point depressant, such as a an alkylene glycol; and from about 0.1% to about 1% of a corrosion resistant agent, such as ammonia. Preferably, the freezing point depressant is an alkylene glycol, such as ethylene glycol, the corrosion resistant agent is ammonia, and the vapor pressure depressant is a glycol ether, such as 2-butoxyethanol, or an alkyl acetate.

It has also been surprisingly discovered that aqueous sealants combined with preferred vapor pressure depressants, such as butyl cellosolve (2-butoxyethanol), are miscible with 134a; thus, a homogenous sealant and inflator composition is formed, which does not require vigorous mixing immediately prior to and during use, thus allowing for uniform dispensing of the product. This is especially useful if a container filled with the sealer and inflator composition is to be used more than once, since poor mixing of the propellant/inflator with the sealant composition tends to lead to incomplete dispensing of the sealant composition. Preferably, containers are filled with sufficient sealant and 134a that standard automotive and light truck tires can be completely inflated at ambient temperature, with a resulting internal pressure in the tire being sufficient to support the weight of a vehicle.

The following non-limiting examples demonstrate preferred methods for making and using the improved sealer and inflator compositions of the present invention. It is to be understood that a wide variety of other sealants and vapor pressure depressants than those mentioned herein may be used with nonflammable propellant/inflator substances having ODPs of zero without requiring undue experimentation by one of skill in the art or departure from the spirit and teachings herein.

MATERIALS

A preferred sealant is a polyvinyl acetate emulsion sold under the trade name FLEXBOND 150 EMULSION ® and is available from Air Products & Chemicals, Inc.; 134A propellant was obtained from ICI Products, Wilmington, Delaware 19897. Vapor pressure depressants, such as butyl cellosolve (2-butoxyethanol), butyl carbitol ® (diethylene glycol monobutyl ether), butyl acetate, and cellosolve acetate, were obtained from a variety of chemical suppliers, and are generally available, as are ammonia, and alkylene glycols, such as ethylene glycol.

EXAMPLE 1

The vapor pressure of Freon 12 (R-12 or dichlorodifluoromethane) and R-134a were determined to be 180 psig and 198 psig at 129° F., respectively. Two hundred gram samples of liquified 134a were then combined with 285 grams of water and 114 grams of various vapor pressure depressants. The vapor pressures were then determined at 70° F. and at 129° F. with the following results:

| Vapor Pressure Depressant | Pressure at 70° F. | Pressure at 129° F. |
|---|---|---|
| 2-Butoxyethanol | 67 psig | 160 psig |
| Butyl acetate | 46 psig | 115 psig |
| Diethylene glycol monobutyl ether | 70 psig | 175 psig |
| Cellosolve acetate | 48 psig | 125 psig |

These experiments led to the choice of 2-butoxyethanol as a preferred vapor pressure depressant, since compositions containing 2-butoxyethanol can be produced according to the present invention so as to have a vapor pressure sufficiently high at ambient temperatures (50°-90° F.) that the 134a in the compositions will not liquify at the inflation pressures of most conventional automobile tires, yet the compositions containing 2-butoxyethanol have a vapor pressure which is sufficiently low at 130° F. that there is little danger that 2P containers will burst, if used to store and transport the sealing and inflating compositions.

It is particularly important that the bursting pressure of the containers used be substantially higher than the vapor pressure of the sealer and inflator mixture at 130° F. Studies have shown that automobile temperatures, where most containers of sealant and inflator compositions are stored, may routinely exceed 130° F. For example, a study on the safety of storing aerosol containers in automobiles showed that when the outside temperature was 90° F., the temperature in the trunk of the test vehicles ranged from 104° to 134° F., the temperature at the rear ledge of the vehicles ranged between 120° and 163° F., and interior temperatures ranged from 112° to 151° F. One sample, obtained in June of 1970, is particularly interesting: a black car with clear glass was parked in an open area facing south. At 1:30 pm, at an ambient air temperature of 113° F., an interior temperature at driver breath level of 175° F. was reached. At that same time, 233° F. was recorded on the surface of the rear package shelf, 222° F. was measured on the painted metal surface of the dashboard, and 192° F. was measured on the chrome-plated lap buckle for the seat belt assembly.

Therefore, in certain extreme high temperature situations, it is possible that containers of the sealer and inflator composition of the present invention may burst. However, this will cause minimal environmental or flammability problems, especially if the containers burst while being stored in the trunk of a vehicle, since 134a is non-flammable and does not harm the ozone layer. However, existing tire sealant and inflator compositions may burst under these conditions, and will release ozone-depleting compounds into the atmosphere or create a potentially hazardous condition.

EXAMPLE 2

A sealant composition was formed as follows:

| Ingredient | Amount |
|---|---|
| water | 687 grams |
| ammonium hydroxide | 6.5 grams |
| vinyl acetate copolymer (Flexbond 150) | 67.6 grams |
| Ethylene glycol | 40 grams |
| Butyl cellosolve | 200 grams |

Figure 2:
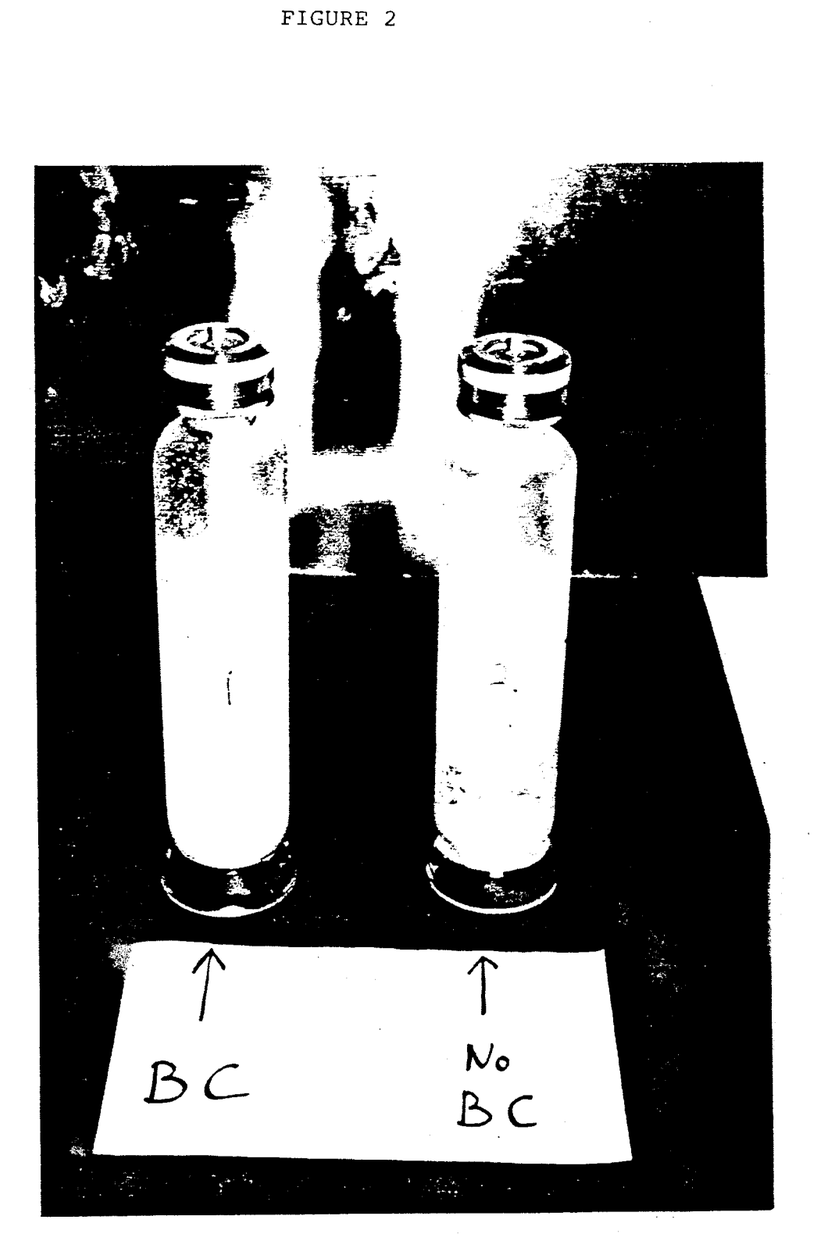
FIG. 2 is a photograph of two sealer and inflator compositions contained in transparent containers, which demonstrates the effect of adding 2-butoxyethanol.

The sealant composition had a milky white appearance. Vapor pressures were determined by adding various amounts of the sealant composition to transparent glass aerosol containers (such as those shown in FIG. 2), and varying amounts of 134a were injected into the glass containers. The vapor pressures for the various mixtures were determined at room temperatures and are presented below:

| Amount of Sealant Composition (grams) | Amount of 134a (grams) | Vapor Pressure (psig) |
|---|---|---|
| 152.8 | 5.9 | 15 |
| 152.8 | 24 | 46 |
| 152.1 | 88.4 | 58 |

As a control, the vapor pressure of 134a combined with water was also measured in identical glass aerosol containers; 157.2 grams of water combined with 8.2 grams of 134a had a vapor pressure of 54 psig; 157.2 grams of water combined with 21.9 grams of 134a had a vapor pressure of 60 psig. Thus, the sealant composition clearly acts to significantly reduce the vapor pressure of 134a at ambient temperatures, since 88.4 grams of 134a produced a vapor pressure of 58 psig when combined with the sealant composition, while 21.9 grams of 134a combined with approximately the same amount of water had a vapor pressure of 60 psig.

EXAMPLE 3

Figure 3:
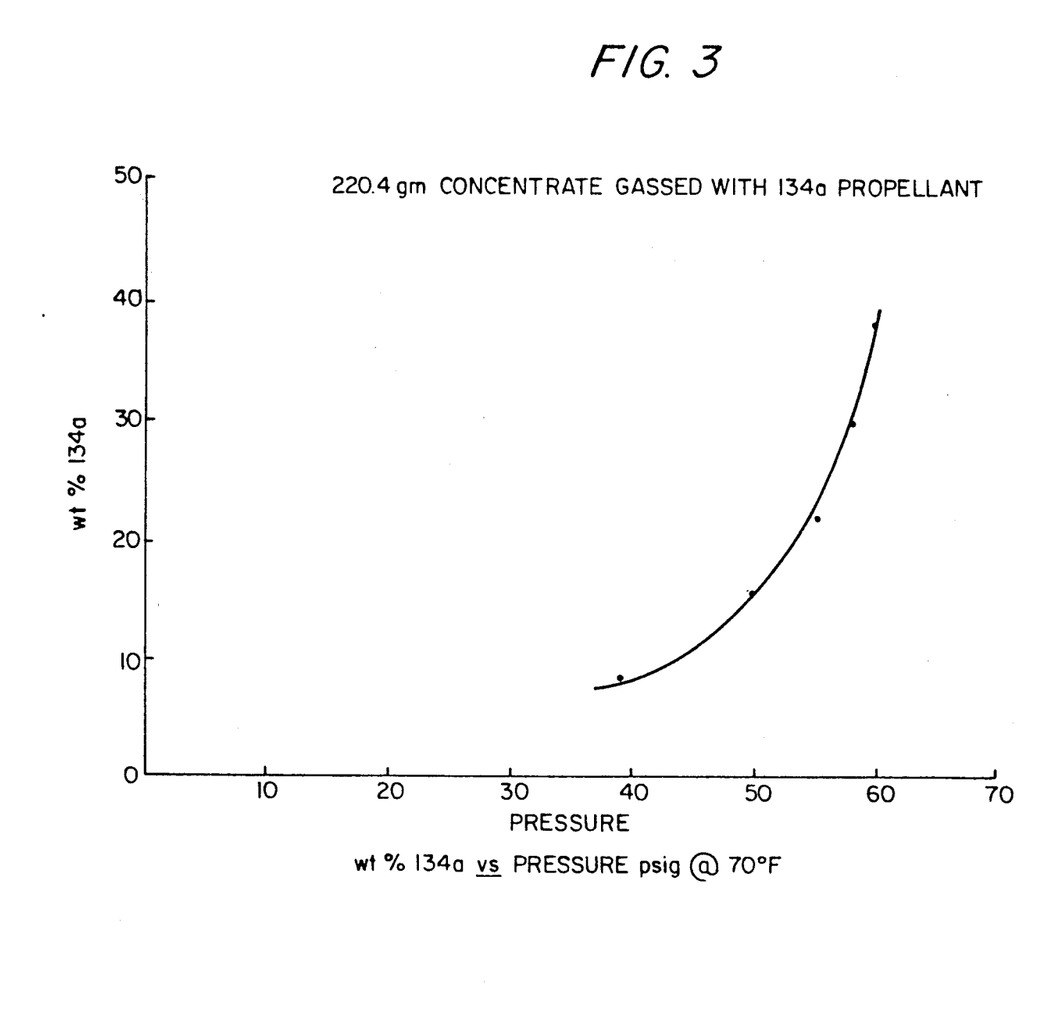
FIG. 3 is a chart of vapor pressure at approximately 70° F. versus the weight percent of 134a combined with 220.4 grams of a preferred sealant composition.

Varying amounts of 134a were added to 220.4 grams of the sealant composition of Example 2, and the vapor pressure was determined. With reference to FIG. 3, a chart of vapor pressure versus weight per cent of 134a added to the sealant composition is illustrated. It is noted that, as the weight percent of 134a increases, the vapor pressure of the sealant and inflator mixture approaches but does not exceed that of pure 134a.

EXAMPLE 4

Figure 4:
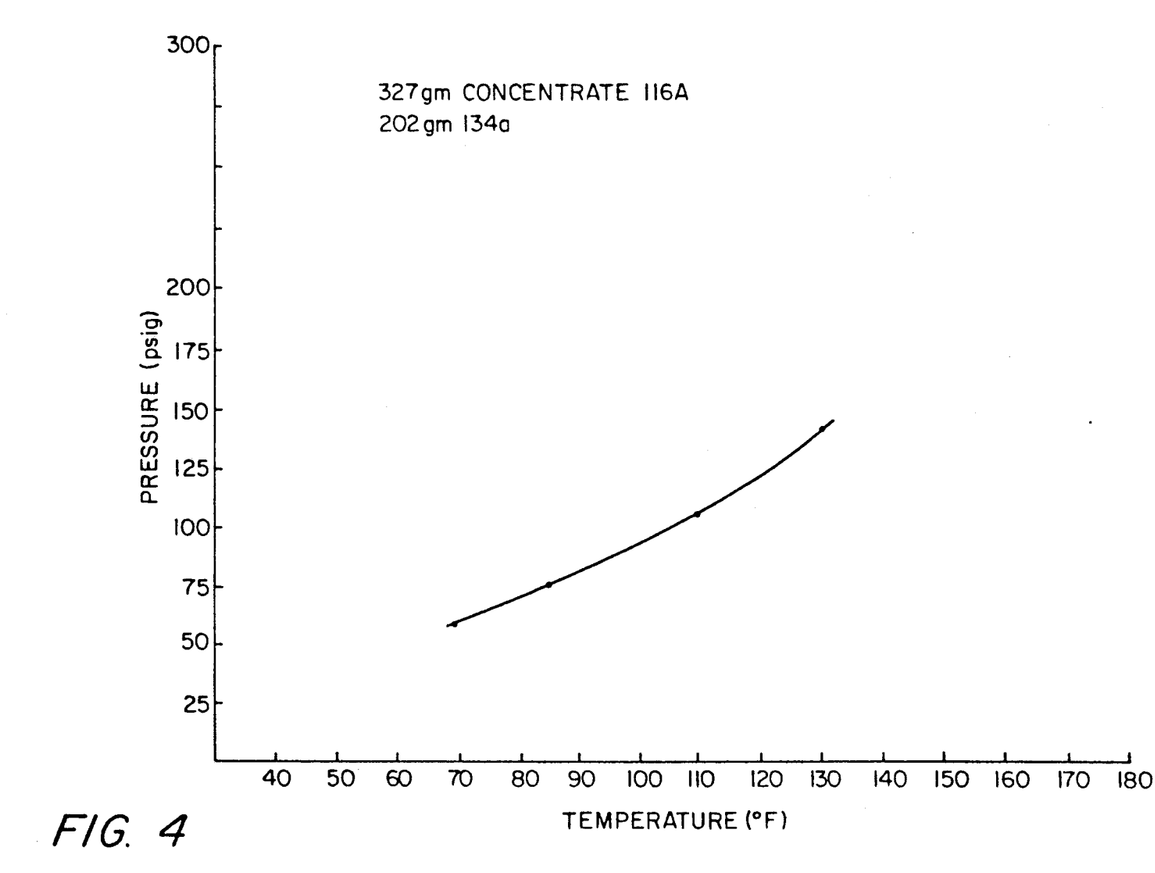
FIG. 4 is a chart comparing the vapor pressure versus temperature of a preferred sealant and inflator composition of the present invention containing 202 grams of 134a and 327 grams of a preferred sealant composition.

A sealant composition was formed in accordance with Example 2, and 327 grams of the sealant composition were added to a glass aerosol bottle. Two hundred and two grams of 134a were injected into the glass aerosol bottle, and vapor pressure was measured over the temperature range of 70°–130° F. With reference to FIG. 4, a chart of vapor pressure versus temperature is shown for this composition. Note that at 130° F., the vapor pressure is less than 150 psig. Thus, a DOT 2P can may be used with this composition. Line 3 of FIG. 1 reproduces the curve of FIG. 4 to demonstrate the lower vapor pressures achieved through the addition of a suitable vapor pressure depressant.

EXAMPLE 5

A sealant composition was prepared as in Example 2, but no 2-butoxyethanol was added. A 220.4 gram aliquot of the sealant composition was added to a glass aerosol bottle, and 134a was injected into the glass aerosol bottle. With reference to FIG. 2, a photograph is shown of two glass aerosol bottles. The bottle labeled 1 contains a preferred sealant composition of the present invention combined with 134a and 2-butoxyethanol, while the bottle labeled 2 contains just 134a combined with the sealant composition. Note that the sealant and inflator composition in bottle 1, which contains 2butoxyethanol, forms a homogenous, milky-white solution, while the sealant composition in bottle 2, which does not contain 2butoxyethanol, divides into two separate phases, with the 134a settling to the bottom. Thus, the 2-butoxyethanol acts not only to reduce the vapor pressure, but also to create an homogeneous mixture which allows for consistent discharge throughout the dispensing of the sealant and propellant/inflator without requiring frequent and vigorous agitation.

TIRE INFLATION

As a guide for determining the amount of 134a necessary to inflate various tires, the following Good Year ® automobile tire capacities are provided, with it being understood that other automobile tires may be used and may vary in their capacity:

| Tire Size | Tire Capacity | Type of Car |
|---|---|---|
| P185, R13 | .97 Cubic Feet | Compact Car |
| P195, R14 | 1.01 Cubic Feet | — |
| P205, R14 | 1.17 Cubic Feet | Mid-Size |

-continued

| Tire Size | Tire Capacity | Type of Car |
|---|---|---|
| P205, R15 | 1.15 Cubic Feet | — |
| P215, R15 | 1.42 Cubic Feet | Large Car |

Sufficient 134a must be provided in containers designed for storing and transporting the sealer and inflator composition to both inflate tires or other inflatable objects, and to adjust for losses of 134a due to leaks in the tire or other inflatable object (e.g., leaks may not be immediately sealed by the sealant composition, and some 134a may escape before the sealant seals any openings). Preferably, aerosol DOT-2P or DOT-2Q cans are filled with between 100 and 300 grams of 134a and with between 50 and 300 grams of a sealant composition, such as, but not limited to, the sealant composition described in Example 2 above.

EXAMPLE 6

The pressure in a flat Goodyear ® brand tire, P165/80R13, was measured and determined to be 0 psig. Into an aerosol container were added 327 grams of the sealant composition described in Example 2 and 202 grams of 134a. The adapter/actuator on the aerosol container was connected to the tire valve stem, and the contents of the container were propelled into the tire upon actuation of the valve. Upon exhaustion of substantially all of the contents of the container, the adapter/actuator was detached from the tire valve stem. The pressure in the filled tire was measured and found to be approximately 26 psig; this pressure is slightly less than the ideal gas law would predict, but the difference between the actual and theoretical pressure may be due to factors such as loss of 134a to the atmosphere during inflation, 134a remaining in the container, tire volume expansion, and reduced tire interior temperature.

Note that at lower temperatures, a greater molar amount of 134a will be needed to properly inflate tires than at ambient or high temperatures, and in a preferred embodiment, sufficient 134a is provided in containers of the sealant and propellant/inflator composition of the present invention to inflate most conventional automotive and light truck tires at temperatures of approximately 25° F.

It is contemplated that a variety of sealant compositions can be used, which may or may not contain a freezing-point depressant or an anti-corrosive agent. It is also contemplated that other non-flammable, propellant/inflators may be used in place of 134a, provided that they have an ozone depletion potential beneath 0.10, have a vapor pressure substantially high enough at ambient temperatures to maintain tire inflation, and have Vapor pressures below 180 psig at 130° F. when combined with a suitable sealant composition. As will be readily apparent to one of skill in the art, the size and strength of the containers, the amount or type of vapor pressure depressant, the amount of 134a, and the type and ratios of ingredients in the sealant may be Varied without departing from the essential spirit and scope of this invention.

From the above teachings, it is apparent that many modifications and variations of the present invention are possible. It is therefore to be understood that the invention may be practiced otherwise than as specifically described.

We claim:

1. A sealer and inflator composition, comprising:

a sealant; and a non-flammable propellant/inflator having an ozone depletion potential of zero.

2. A composition according to claim wherein said propellant/inflator is 1,1,1,2-tetrafluoroethane.

3. A composition according to claim 1, further comprising:

a vapor pressure depressant.

4. A composition according to claim 3, wherein:

said propellant/inflator is 1,1,1,2-tetrafluoroethane, and said composition comprises from about 20 percent to about 80 percent of said 1,1,1,2-tetrafluoroethane.

5. A composition according to claim 4, wherein:

said vapor pressure depressant is selected from the group consisting of glycol ethers, and alkyl acetates.

6. A composition according to claim 4, wherein:

said sealant comprises a polyvinyl acetate emulsion, an alkylene glycol, ammonia, water, and a glycol ether.

7. A composition according to claim 6, wherein:

said composition comprises:

from about 2 percent to about 10 percent of said polyvinyl acetate emulsion, from about 1 percent to about 8 percent of said alkylene glycol, from about 0.1 to about 1 percent of said ammonia, from about 30 percent to about 70 percent of said water, and from about 4 percent to about 40 percent of said glycol ether.

8. A composition according to claim 7, wherein:

said glycol is ethylene glycol; and said glycol ether is 2-butoxyethanol.

9. A composition according to claim 1, wherein said sealant is biodegradable.

10. A composition, comprising:

a sealant; and 1,1,1,2-tetrafluoroethane.

11. The combination, comprising;

container means for containing liquids and gases under pressure;

a sealant mixture in said container means; and 1,1,1,2-tetrafluoroethane in said container means.

12. The combination of claim 11, wherein the pressure in said container means does not exceed 180 psig when the temperature in said container means is 130° F.

13. A method for inflating inflatable objects formed with rubber, such as tires, said inflatable objects having input ports for allowing inflation thereof, comprising the steps of:

providing a container having therein a pressurized mixture of a sealant and a non-flammable propellant/inflator, said propellant/inflator having an ozone depletion potential of zero and said sealant capable of sealing openings in said inflatable objects upon contact with air, said pressure in said container being sufficient to liquify said propellant/inflator at ambient temperatures, and said container having a discharge port with a valve for regulating fluid flow through said discharge port;

engaging said discharge port of said container with the input port of an inflatable object, the pressure inside of said inflatable object being less than the pressure in said container; and actuating said valve to allow fluid communication between said container and said inflatable object, the temperature and said pressure in said inflatable object being such that said liquified propellant/inflator is transformed into the gaseous state with the resultant expansion of the gas formed thereby being sufficient to both propel at least some of said sealant and propellant/inflator into said inflatable object and to at least partially inflate said object.

14. A method according to claim 13, wherein:

said composition comprises:

from about 20 percent to to about 80 percent of said propellant/inflator, said propellant/inflator being 1,1,1,2-tetrafluoroethane, from about 2 percent to about 10 percent of a polyvinyl acetate emulsion, from about 1 percent to about 8 percent of glycol, from about 0.1 to about 1 percent of ammonia, from about 30 percent to about 70 percent of water, and from about 4 percent to about 40 percent of glycol ether.

15. A method according to claim 14, wherein:

said glycol is ethylene glycol; and said glycol ether is 2-butoxyethanol.

16. A method according to claim 13, wherein:

said pressure in said inflatable object is less than about 60 pounds per square inch before and after inflation.

17. A method for inflating inflatable objects, such as tires, comprising inflating an inflatable object with 1,1,1,2-tetrafluoroethane.

18. A method according to claim 17, wherein:

said 1,1,1,2-tetrafluorethane is stored under pressure in a container, said pressure in said container being sufficient to liquify said 1,1,1,2-tetrafluorethane at ambient temperatures, and wherein said pressure in said inflatable object is less than the pressure in said container so that said said 1,1,1,2-tetrafluoroethane is converted to the gaseous state and expands to inflate said inflatable object.

19. A method according to claim 17, wherein:

said pressure in said inflatable object is less than about 60 pounds per square inch before and after inflation.

* * * * *

UNITED STATES PATENT AND TRADEMARK OFFICE
CERTIFICATE OF CORRECTION

PATENT NO. : 5,124,395
DATED : June 23, 1992
INVENTOR(S) : Horst Abramowski; James D. Wells It is certified that error appears in the above-identified patent and that said Letters Patent is hereby corrected as shown below:

On the title page:

Item (75): "Inventors:", change "Herst" to --Horst--.

Under "OTHER PUBLICATIONS":

line 1, change "Lay" to --Layer--; and
line 3, change "Gropu," to --Group,--.

Under "ABSTRACT":

line 19, change "combine" to --combined--.

Column 2, line 68, change "ODP=zero)" to --(ODP=zero)--.

Claim 2, line 1, after "claim" insert --1,--.

Signed and Sealed this

Thirtieth Day of November, 1993

Attest:

Attesting Officer

BRUCE LEHMAN

Commissioner of Patents and Trademarks

UNITED STATES PATENT AND TRADEMARK OFFICE
CERTIFICATE OF CORRECTION

PATENT NO. : B1 5,124,395

DATED : June 22, 1999

INVENTOR(S) : Abramowski et al.

It is certified that error appears in the above-identified patent and that said Letters Patent is hereby corrected as shown below:

Column 1, line 32, "1,1,2,2 - tetrafluoroethane" should read --1,1,1,2 - tetrafluoroethane--; line 42, "depletieon" should read --depletion--; line 42, after "comprising" the colon (:) should be a semicolon (;); line 54, after "for" insert --inflating--.

Column 2, line 13, "with" should read --said--; line 16, "iinflator" should read --inflator--.

Column 3, line 36, "capbale" should read --capable--.

Column 4, lines 6-7, "flexible tube" should read --container--.

Signed and Sealed this

Twelfth Day of December, 2000

*Attest:*

Q. TODD DICKINSON

*Attesting Officer*      *Director of Patents and Trademarks*

REEXAMINATION CERTIFICATE (3787th)
United States Patent [19]
Abramowski et al.

[11] B1 5,124,395
[45] Certificate Issued Jun. 22, 1999

[54] NON-OZONE DEPLETING, NON-FLAMMABLE TIRE SEALER AND INFLATER COMPOSITION

[75] Inventors: Herst Abramowski, Matthews; James D. Wells, Charlotte, both of N.C.

[73] Assignee: Radiator Specialty Company, Charlotte, N.C.

Reexamination Requests:
No. 90/003,875, Jul. 6, 1995
No. 90/004,504, Dec. 31, 1996

Reexamination Certificate for:
Patent No.: 5,124,395
Issued: Jun. 23, 1992
Appl. No.: 07/691,419
Filed: Apr. 25, 1991

[51] Int. Cl.$^6$ .................. C08J 3/03; C08K 5/02; C08L 27/12
[52] U.S. Cl. .................. 524/462; 524/377; 524/428; 524/563
[58] Field of Search .................. 524/377, 428, 524/462, 563

[56] References Cited

U.S. PATENT DOCUMENTS

| | | | |
|---|---|---|---|
| 3,860,539 | 1/1975 | Miyazato | 523/166 |
| 4,501,825 | 2/1985 | Magyar | 521/78 |
| 4,513,803 | 4/1985 | Reese | 152/427 |
| 4,851,595 | 7/1989 | Gumprecht | 570/170 |
| 4,970,242 | 11/1990 | Lehman | 521/78 |
| 5,011,866 | 4/1991 | Suh | 521/97 |
| 5,284,895 | 2/1994 | Gupta . | |
| 5,618,912 | 4/1997 | Fang | 528/397 |
| 5,648,406 | 7/1997 | Peelor et al. | 523/166 |

FOREIGN PATENT DOCUMENTS

122757  8/1969  India .

OTHER PUBLICATIONS

Judgment by Consent and Permanent Injunction, Radiator Specialty Company v. Specialty Chemical Resources, Inc.; Aerosol Systems, Inc. and Taylor Made Products; C.A. No. 3:94CV293–MU, filed Oct. 4, 1996.

Order dated Mar. 25, 1998, United States District Court for the Western District of North Carolina.

Defendant's Answers to Plaintiff Radiator Specialty Company's First set of Interrogatories to Defendant IQ Products Company, Civ. Act. No. 3:97CV69–MCK, Apr. 22, 1998.

Defendant's Response to Plaintiff Radiator Specialty Company's First set of Requests for Production of Documents and Things to Defendant IQ Products Company, Civ. Act. No. 3:97CV69–MCK, Apr. 22, 1998.

Exhibits IQ 00001 through IQ 00016.

The Ozone Layer, The Greenhouse Effect, ICI Americas Inc General Chem Dept, Halocarbon Dev Group Wilmington DE..

(List continued on next page.)

*Primary Examiner*—James J. Seidleck

[57] ABSTRACT

A new tire sealant and inflator composition is provided, which combines a sealant in an aqueous carrier with a non-flammable, non-ozone depleting propellant/inflator. A preferred composition combines a sealant composition with 1,1,1,2-tetrafluoroethane (134a). In a preferred embodiment, a vapor pressure depressant is combined with the sealant and 134a. A preferred sealant and inflator composition comprises from about 20% to about 80% of 134a, from about 2% to about 10% of a sealer, such as latex, or a polyvinyl acetate emulsion; from about 1% to about 8% of a freezing point depressant, such as an alkylene glycol; from about 0.1% to about 1% of a corrosion inhibitor, such as ammonia; from about 30% to about 70% of a carrier, such as water; and from about 4% to about 40% of a vapor pressure depressant, such as a glycol ether. A preferred vapor pressure depressant is 2-butoxyethanol, and a preferred freezing point depressant is ethylene glycol. Preferably the sealant composition combine with 134a or other non-flammable and non-ozone depleting propellant/inflator is biodegradable.

OTHER PUBLICATIONS

ARCTON134a Preliminary Data Sheet ICI Chemicals+Polymers Limited Broch. GC/16882/20080/4ed/13/78 Jul. 1989.

Potential Substitutes to Chloroflurocarbons as Aerosol Propellants, ICI Chemicals+Polymer LDT.

"H" CFCS The Chemical Industry's New Ozone Destroyers Briefing Sheet, p. 61, FOE International.

ICI Chemicals & Polymers Ltd. Brochure entitled "Potential Substitutes to Chlorofluorocarbons as Aerosol Propellants".

Thomas P. Nelson and Sharon L. Wevill; "*Alternative Formulations and Packaging to Reduce Use of Chlorofluorocarbons (CFCs)*"; (Copyright 1990 by Noyes Data Corporation); pp. 39, 54, 70, 75–76, 78–79, 154, 160, 164, and 170.

"*Background on Aerosol Products and Pressurized Dispensers Containing Class 2 Substances*"; p. 54.

Paul A. Sanders, "*Principles of Aerosol Technology*", Van Nostrand Reinhold Comany, (Copyright 1970), p. 6.

EPA Publication "*Alternative formulations to Reduce CFC (Chlorofluorocarbons) Use in U.S. Exempted and Excluded Aerosol Products*"; (Report Date: Nov. 1989), p. 70.

ICI Chemicals and Polymers Ltd Brochure entitled "*Potential Substitues to Chlorofluorocabrons as Aerosol Propellants*".

ICI Chemicals and Polymers Ltd Brochure entitled "*The Ozone Layer—The Greenhouse Effect*", pp. 1–7.

Schröder et al.; "*Investigation of the explosion range of the CFC–substitute 1,1,1,2–tetrafluoroethane (R134a) under non–atmospheric conditions*"; (Copyright 1995).

"What Alternatives to the Use of CFC's?"; Copyright 1994 Rapra Technology Limited.

Genetron®/Allied Signal, "*Fluorocarbons for Tomorrow*"; (Copyright Date 1987, 1989).

EPA Publication; "*Alternative Formulations to Reduce CFC (Chlorofluorocabrons Use in U.S. Exempted and Excluded Aerosol Products*"; (Report Date: Nov. 1989), pp. 1–144.

Nelson, et al.; "*Aerosol Industry Success In Reducing CFC Propellant Usage*"; EPA (Nov. 1989); pp. 1–219.

Donald P. Dunn; "'*Dymel' Propellants as Replacements for CFC Propellants*"; (Copyright 1991).

John J. Sciarra, et al.; "*The Science and Technology of Aerosol Packaging*"; (Copyright 1974).

Paul A. Sanders, "*Principals of Aerosol Technology*"; Van Nostrand Reinhold Company, (Copyright 1970), pp. 6, 22, 24, 73–90, 161.

Press release regarding recall of STP Flat Tire Repair Product dated Jan. 27, 1994.

"Recall of flat–fixers in can puts spotlight on injuries"; newspaper article from *The Atlanta Journal/The Atlanta Constitution*; Jan. 27, 1994.

"Fluorocarbons For Tomorrow", *Genetron°*, Allied–Signal, Mar. 1989.

Potentially Acceptable Substitutes for the Chlorofluorocarbons: Properties and Peformance Feabures of HFC–134a, HCFC–123, and HCFC–141b; B. Sukornick; *International Journal of Thermophysics*, vol. 10, No. 3, 1989.

Consumer advisory from the U.S. Department of Transportation entitled "NHTSA Warns About Hazards Of Fixing Tires Filled With Aerosol Inflators", dated Sep. 24, 1991.

Order from United States District Court for the Southern District of Texas, Houston Division, Civil Action No. 94–1894.

Basu et al; Thermophysical Properties of 1,1,1,2–Tetrafluoroethane (R–134a); *International Journal of Thermophysics*, 10:3 (1989).

Cost Sheet—#659 Emergency Tire Inflator 12 OZ.; X Labs, Customer (Sep. 11, 1989).

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 7, 8 and 15 is confirmed.

Claims 1–4, 10–13 and 17–19 are cancelled.

Claims 5, 6, 9, 14 and 16 are determined to be patentable as amended.

New claims 20–48 are added and determined to be patentable.

5. [A composition according to claim 4, wherein:] *A sealer and inflator composition, comprising:*

*a sealant;*

*a non-flammable propellant/inflator having an ozone depletion potential of zero and*

*a vapor pressure depressant wherein said propellant/ inflator is 1,1,2,2-tetrafluoroethane, and said composition comprises from about 20 percent to about 80 percent of said 1,1,1,2-tetrafluoroethane; and* wherein said vapor pressure depressant is selected from the group consisting of glycol ethers, and alkyl acetates.

6. [A composition according to claim 4, wherein:] *A sealer and inflator composition, comprising:*

*a sealant;*

*a non-flammable propellant/inflator having an ozone depletieon potential of zero further comprising: and*

*a vapor pressure depressant;*

*wherein said propellant/inflator is 1,1,1,2- tetrafluoroethane, and said composition comprises from about 20 percent to about 80 percent of said 1,1,1,2-tetrafluoroethane; and* said sealant comprises a polyvinyl acetate emulsion, an alkylene glycol, ammonia, water, and *said vapor pressure depressant comprises* a glycol ether.

9. A composition according to claim [1] *5*, wherein said sealant is biodegradable.

14. A method [according to claim 13,] *for inflatable objects formed with rubber, such as tires, said inflatable objects having input ports for allowing inflation thereof, comprising the steps of:*

*providing a container having therein a pressurized mixture of a sealant and a non-flammable propellant/ inflator, said propellant/inflator having an ozone depletion potential of zero and said sealant capable of sealing openings in said inflatable objects upon contact with air, said pressure in said container being sufficient to liquify said propellant/inflator at ambient temperatures, and said container having a discharge port with a valve for regulating fluid flow through said discharge port;*

*engaging said discharge port of said container with the input port of an inflatable object, the pressure inside of said inflatable object being less than the pressure in said container; and*

*actuating said valve to allow fluid communication between said container and said inflatable object, the temperature and said pressure in said inflatable object being such that said liquified propellant/inflator is transformed into the gaseous state with the resultant expansion of the gas formed thereby being sufficient to both propel at least some of said sealant and propellant/inflator into said inflatable object and to at least partially inflate with object;* wherein:

said composition comprises:

from about 20 percent to [to] about 80 percent of said propellant/inflator, said propellant/iinflator being 1,1,1,2-tetrafluoroethane, from about 2 percent to about 10 percent of a polyvinyl acetate emulsion, from about 1 percent to about 8 percent of glycol, from about 0.1 to about 1 percent of ammonia, from about 30 percent to about 70 percent of water, and from about 4 percent to about 40 percent of glycol ether.

16. A method according to claim [13] *14*, wherein:

said pressure in said inflatable object is less than about 60 pounds per square inch before and after inflation.

*20. A non-flammable, non-ozone depleting tire sealer and inflator composition comprising:*

*a sealer capable of sealing openings in inflatable objects on contact with air;*

*a carrier;*

*1,1,1,2-tetrafluoroethane; and*

*a vapor pressure depressent for said 1,1,1,2- tetrafluoroethane;*

*said non-flammable, non-ozone depleting composition having a vapor pressure at 130° F. which does not exceed 180 psig.*

*21. The tire sealer and inflator composition of claim 20, having a vapor pressure at 130° F. which does not exceed 160 psig.*

*22. The tire sealer and inflator composition of claim 20 wherein said carrier is water.*

*23. The tire sealer and inflator composition of claim 21 wherein said carrier is water.*

*24. The tire sealer and inflator composition of claim 20 wherein said vapor pressure depressant is selected from the group consisting of glycol ethers, and alkyl acetates.*

*25. The tire sealer and inflator composition of claim 21 wherein said vapor pressure depressant is selected from the group consisting of glycol ethers, and alkyl acetates.*

*26. The tire sealer and inflator composition of claim 22 wherein said vapor pressure depressant is selected from the group consisting of glycol ethers, and alkyl acetates.*

*27. The tire sealer and inflator composition of claim 23 wherein said vapor pressure depressant is selected from the group consisting of glycol ethers, and alkyl acetates.*

*28. The tire sealer and inflator composition of claim 20 wherein said composition comprises from about 20 wt. percent to about 80 wt. percent of said 1,1,1,2- tetrafluoroethane.*

*29. The tire sealer and inflator composition of claim 21 wherein said composition comprises from about 20 wt. percent to about 80 wt. percent of said 1,1,1,2- tetrafluorethane.*

*30. The tire sealer and inflator composition of claim 24 wherein said composition comprises from about 20 wt.* percent to about 80 wt. percent of said 1,1,1,2-tetrafluoroethane.

31. The tire sealer and inflator composition of claim 25 wherein said composition comprises from about 20 wt. percent to about 80 wt. percent of said 1,1,1,2-tetrafluoroethane.

32. The tire sealer and inflator composition of claim 26 wherein said composition comprises from about 20 wt. percent to about 80 wt. percent of said 1,1,1,2-tetrafluoroethane.

33. The tire sealer and inflator composition of claim 27 wherein said composition comprises from about 20 wt. percent to about 80 wt. percent of said 1,1,1,2-tetrafluoroethane.

34. The tire sealer and inflator composition of claim 20 which is capable of inflating a conventional automotive tire at a temperature of about 25° F.

35. The tire sealer and inflator composition of claim 21 which is capable of inflating a conventional automotive tire at a temperature of about 25° F.

36. The tire sealer and inflator composition of claim 22 which is capable of inflating a conventional automotive tire at a temperature of about 25° F.

37. The tire sealer and inflator composition of claim 23 which is capable of inflating a conventional automotive tire at a temperature of about 25° F.

38. The tire sealer and inflator composition of claim 24 which is capable of inflating a conventional automotive tire at a temperature of about 25° F.

39. The tire sealer and inflator composition of claim 25 which is capable of inflating a conventional automotive tire at a temperature of about 25° F.

40. A tire sealer and inflator product comprising:

a non-flammable, non-ozone depleting tire sealer and inflator composition, said composition comprising a sealer capbale of sealing openings in inflatable objects on contact with air, a carrier, 1,1,1,2-tetrafluoroethane, and a vapor pressure depressant for said 1,1,1,2-tetrafluoroethane, said composition having a vapor pressure at 130° F. which does not exceed 180 psig; and an aerosol container capable of containing liquids and gases under pressure, said container including an exit port;

a flexible tube connected to said exit port of said flexible tube and terminating with a connector that can be fitted to a conventional tire valve stem;

said composition being contained in said container under sufficient pressure to liquify said propellant.

41. The tire sealer and inflator product of claim 40 wherein said carrier is water.

42. The tire sealer and inflator product of claim 40 wherein said vapor pressure depressant is selected from the group consisting of glycol ethers and alkyl acetates.

43. The tire sealer and inflator product of claim 41 wherein said vapor pressure depressant is selected from the group consisting of glycol ethers and alkyl acetates.

44. The tire sealer and inflator product of claim 40 wherein said composition comprises from about 20 weight percent to about 80 weight percent of said 1,1,1,2-tetrafluoroethane.

45. The tire sealer and inflator product of claim 42 wherein said composition comprises from about 20 weight percent to about 80 weight percent of said 1,1,1,2-tetrafluoroethane.

46. The tire sealer and inflator product of claim 43 wherein said composition comprises from about 20 weight percent to about 80 weight percent of said 1,1,1,2-tetrafluoroethane.

47. The tire sealer and inflator composition of claim 40 wherein said product is capable of inflating a conventional automotive tire at a temperature of about 25° F.

48. The tire sealer and inflator product of claim 40 wherein said composition comprises between about 100 and about 300 grams of said 1,1,1,2-tetrafluoroethane.

* * * * *